US009856022B2

(12) United States Patent
Schmitz et al.

(10) Patent No.: US 9,856,022 B2
(45) Date of Patent: Jan. 2, 2018

(54) STOWAGE BIN SYSTEMS

(71) Applicant: The Boeing Company, Chicago, IL (US)

(72) Inventors: Chad D. Schmitz, Arlington, WA (US); Aucheun Saechao, Seattle, WA (US); Ann Marie Miller, Mill Creek, WA (US); Russell W. Keck, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1125 days.

(21) Appl. No.: 14/041,361

(22) Filed: Sep. 30, 2013

(65) Prior Publication Data
US 2015/0090838 A1    Apr. 2, 2015

(51) Int. Cl.
*B64C 1/00*    (2006.01)
*B64D 11/00*   (2006.01)

(52) U.S. Cl.
CPC .................................. *B64D 11/003* (2013.01)

(58) Field of Classification Search
USPC ............... 244/118.1, 118.5, 117 R, 118.2
See application file for complete search history.

(56) References Cited

U.S. PATENT DOCUMENTS

| | | | | | |
|---|---|---|---|---|---|
| 5,108,048 | A | * | 4/1992 | Chang | B64D 11/003 244/118.1 |
| 5,716,027 | A | * | 2/1998 | Hart | B64D 11/003 244/118.1 |
| 5,842,668 | A | * | 12/1998 | Spencer | B64D 11/003 244/118.1 |
| 6,318,671 | B1 | * | 11/2001 | Schumacher | B64D 11/003 244/118.5 |

(Continued)

FOREIGN PATENT DOCUMENTS

| | | |
|---|---|---|
| CN | 101687550 A | 3/2010 |
| DE | 4446772 C1 | 5/1996 |

(Continued)

OTHER PUBLICATIONS

"Chinese Application Serial No. 201480052428.9, Office Action dated Feb. 4, 2017", 21 pgs.

(Continued)

*Primary Examiner* — Christopher P Ellis
(74) *Attorney, Agent, or Firm* — Kwan & Olynick LLP

(57) ABSTRACT

Provided are stowage bin systems for use on aircrafts and other like vehicles. A stowage bin system may include two disjoint supporting panels and a stowage bin bucket disposed between and pivotally supported by these panels after installation. The supporting panels may be attached to vertical frame members and, in some embodiments, to other frame members, such as adjacent vertical frame members or to horizontal frame members. In some embodiments, a (Continued)

supporting panel may include a gusset extending substantially normal to the main surfaces of the panel. The gusset may provide additional rigidity to the panel and, in some embodiments, include one or more open channels for attaching to a horizontal frame member. The supporting panels transfer all loads generated during operation of the aircraft from the stowage bin bucket and to the fuselage or, more specifically, to vertical and other frame members.

18 Claims, 10 Drawing Sheets

(56) References Cited

U.S. PATENT DOCUMENTS

| | | | | |
|---|---|---|---|---|
| 6,883,753 | B1 * | 4/2005 | Scown | B64D 11/003 244/118.1 |
| 7,832,685 | B2 | 11/2010 | Haynes et al. | |
| 7,887,008 | B2 * | 2/2011 | Lamoree | B64D 11/003 244/118.1 |
| 8,047,468 | B2 | 11/2011 | Schmitz et al. | |
| 8,146,227 | B2 * | 4/2012 | Schmitz | B60R 5/003 224/486 |
| 8,262,022 | B2 * | 9/2012 | Young | B64D 11/003 244/118.1 |
| 8,360,365 | B2 * | 1/2013 | Rahlff | B64D 11/003 244/118.1 |
| 9,033,279 | B2 * | 5/2015 | Graf | B64D 11/003 244/118.5 |
| 9,079,667 | B2 * | 7/2015 | Rafler | B64D 11/003 |
| 2011/0062284 | A1 | 3/2011 | Schmitz et al. | |
| 2011/0186681 | A1 | 8/2011 | Vine et al. | |
| 2013/0076216 | A1 * | 3/2013 | Schmitz | B64D 11/003 312/308 |
| 2014/0152159 | A1 * | 6/2014 | Schneider | B64D 11/003 312/248 |

FOREIGN PATENT DOCUMENTS

| | | | |
|---|---|---|---|
| DE | 19946629 A1 | 4/2001 | |
| DE | 102008049639 A1 | 4/2010 | |
| GB | 2437620 A * | 10/2007 | B64D 11/003 |

OTHER PUBLICATIONS

"International Application No. PCT/US2014/043586, Search Report and Written Opinion dated Oct. 31, 2014", 14 pgs.

"Chinese Application Serial No. 201480052428.9, Office Action dated Sep. 15, 2017", 9 pgs.

* cited by examiner

STOWAGE BIN SYSTEMS

TECHNICAL FIELD

This disclosure generally relates to stowage bin systems for use on aircraft or other types of vehicles and, more specifically, to a stowage bin system including two supporting panels and a stowage bin bucket disposed between and supported by the supporting panels.

BACKGROUND

Modern passenger aircraft are designed such that carry-on luggage is primarily stored in stowage bins above the seats. These stowage bins may extend in a longitudinal direction of the fuselage forming two or more stowage bin rows in the fuselage. For example, two such rows may extend over the window seats, one on each side of the aircraft. Two additional rows may extend in the middle of the fuselage over the center seating area.

Typically, each stowage bin is formed as a separate unit, which includes a frame and a stowage bin bucket supported by the frame. The frame surrounds the bucket and is attached to the fuselage. The frame is usually a standalone component with three or more sides or panels. For example, a frame may include two side panels on each side of the stowage bin bucket and a back panel interconnecting and providing support to the two side panels. The back panel may be used for attaching to the fuselage. Loads generated during operation of the stowage bin bucket may be transferred from the stowage bin bucket to the side panels, then from the side panels to the back panel, and finally from the back panel to the fuselage. In some designs, the loads can be transferred directly from the stowage bin bucket to the back panel, and then from the back panel to the fuselage As such, the frame needs to be mechanically strong to support the weight of the stowage bin bucket, the carry-on luggage placed into the bucket, and other forces generated during various operating conditions, such as acceleration and vibration. The weight of such a frame typically represents a significant part of the overall weight of the stowage bin system. It is highly desirable to reduce the weight of any aircraft component without sacrificing their performance characteristics.

SUMMARY

Provided are stowage bin systems for use on aircrafts and other like vehicles. A stowage bin system may include two disjoint supporting panels and a stowage bin bucket disposed between and supported by these panels after installation. The supporting panels may be attached to vertical frame members and, in some embodiments, to other frame members, such as adjacent vertical frame members or to horizontal frame members. In some embodiments, a supporting panel may include a gusset extending substantially normal to the main surfaces of the panel. The gusset may provide additional rigidity to the panel and, in some embodiments, include one or more open channels for attaching to a horizontal frame member. The supporting panels transfer all loads generated during operation of the aircraft from the stowage bin bucket to the fuselage or, more specifically, to vertical and other frame members.

In some embodiments, a stowage bin system for use on an aircraft includes a first supporting panel and a second supporting panel. The first supporting panel is configured to attach to a first vertical frame member and, in some embodiments, to a first additional frame member of the aircraft. The first additional frame member may be another vertical frame member, a horizontal frame member, or some other component of the fuselage. The second supporting panel is configured to attach to a second vertical frame member and to a second additional frame member of the aircraft. Similar to the first additional frame member, the second additional frame member may be another vertical frame member, a horizontal frame member, or some other component of the fuselage. The stowage bin system also includes a stowage bin bucket, i.e., a first stowage bin. In some embodiments, the system includes multiple stowage bin buckets.

When the stowage bin system is installed, the first stowage bin bucket is disposed between the first supporting panel and the second supporting panel. The first stowage bin bucket may be pivotally attached to the first supporting panel and the second supporting panel. The first supporting panel and the second supporting panel are configured to support loads generated during operation of the first stowage bin bucket and to transfer the loads to the first vertical frame member, the first additional frame member, the second vertical frame member, and the second additional frame member. These loads are generated by the weight of the first stowage bin bucket and baggage stored in the bucket, acceleration of the aircraft, vibration of the aircraft, and other operation conditions to which the aircraft and/or the stowage bin bucket is exposed to.

In some embodiments, the first supporting panel and the second supporting panel may be planar structures parallel to each other. The first supporting panel and the second supporting panel are disjoint structures. In other words, even after installation of the stowage bin system on the aircraft the first supporting panel and the second supporting panel are not directly connected to or touching each other. After installation, the first supporting panel and the second supporting panel are each connected to one or more of the frame members and to the stowage bin bucket disposed between these panels. It should be noted that prior to installation of the system, the first supporting panel and the second supporting panel are each disconnected from any frame members and may be disconnected form the stowage bin bucket. In other words, a stowage bin system may be provided as a disassembled kit.

In some embodiments, the first supporting panel includes a gusset extending substantially normal to main surfaces of the first supporting panel. The main surfaces are defined as surfaces configured to face stowage bin buckets after installation of the system. The gusset may be configured to attach to the first additional frame member, such as a portion of the horizontal frame member or another vertical frame member. The gusset may extend away from both main surfaces of the first panel and, in some embodiments, may form a channel configured to couple to the first additional frame member or, more specifically, to tightly fit the first additional frame member into the channel. The gusset may form a monolithic structure with one or both main surfaces of the first supporting panel or may be a separate component.

In some embodiments, the first additional frame member and the second additional frame member are parts of the same or different horizontal frame members. For example, the first additional frame member may be a part horizontal frame member connected to the first vertical frame member, while the second additional frame member may be a part horizontal frame member connected to the second vertical frame member. Alternatively, the first additional frame member and/or the second additional frame member may be vertical frame members.

In some embodiments, the first supporting panel has a triangular shape and includes a first corner, a second corner, and a third corner. The first corner may be attached to the first vertical frame member. The second corner may be attached to the first additional frame member using, for example, a gusset. The third corner may include a pivoting mechanism for pivotally attaching the first stowage bin bucket.

In some embodiments, the first supporting panel includes an interlocking mechanism for interlocking with the first stowage bin bucket and retaining the first stowage bin bucket in a closed position. The interlocking mechanism may engage an interlocking feature attached to a side of the first stowage bin bucket facing the first supporting panel. In some embodiments, the interlocking mechanism is also configured to transfer load between the first stowage bin bucket and the first supporting panel. The interlocking mechanism may include a release device for disengaging the first stowage bin bucket and allowing the bucket to open. In some embodiments, the interlocking mechanism may be located on the gusset.

In some embodiments, the first supporting panel includes a rate controlling mechanism for controlling a rate of closing and opening of the first stowage bin bucket. The rate controlling mechanism being also connected to the first stowage bin bucket. In some embodiments, the rate controlling mechanism is a component of the bucket and not of the supporting panel. The rate controlling mechanism may be in the form of a liquid-filled cylinder or a gas-filled cylinder.

In some embodiments, the first supporting panel includes a load transferring pad. The load transferring pad may be disposed between and in contact with a main surface of the first supporting panel and a side surface of the first stowage bin bucket when the first stowage bin is in a closed position. The load transfer pad may be configured to transfer the load in the direction substantially normal to the main surface of the first supporting panel. The load transfer pad may be disposed adjacent to the second corner of the first supporting panel attached to the first additional frame member. In some embodiments, the gusset includes a load transferring interface.

In some embodiments, the stowage bin system also includes a second stowage bin bucket pivotally attached to the first supporting panel such that the first supporting panel is disposed between the first stowage bin and the second stowage bin. In this example, the first supporting panel supports at least some load generated during operation of the first stowage bin bucket and the second stowage bin bucket. In these embodiments, the first supporting panel includes a first main surface facing the first stowage bin bucket and a second main surface facing the second stowage bin bucket. The first supporting panel may include a first load transfer pad on the first main surface and a second load transfer pad on the second main surface. In some embodiments, a supporting panel may include only one load transfer pad. Specifically, the first load transfer pad may be disposed between and in contact with the first main surface and a side surface of the first stowage bin bucket when the first stowage bin bucket is in a closed position. The second load transfer pad may be disposed between and in contact with the second main surface and a side surface of the second stowage bin when the second stowage bin is in a closed position. The locations of the first load transfer pad on the first surface and of the second load transfer pad on the second surface may substantially coincide such that some lateral loads may be transferred between the first stowage bin bucket and the second stowage bin bucket through the first supporting panels and the two load transferring pads without imposing a torque on points where the first supporting panel is attached to frame members.

Provided also is an aircraft including a first vertical frame member, a second vertical frame member extending substantially parallel to the first vertical frame member, a first additional frame member, and a second additional frame member. For purposes of this document, substantially parallel or substantially perpendicular is defined as an orientation that deviated by less than 5° from the parallel or perpendicular orientation. As noted above, the first additional frame member and/or the second additional frame member may be additional vertical frame members, portions of a horizontal frame member, or some other frame members. The aircraft also include a first supporting panel attached to the first vertical frame member and to the first additional frame member. In some embodiments, each or one of the two supporting panels is attached only to one frame members, e.g., a vertical frame member. The aircraft also includes a second supporting panel attached to the second vertical frame member and to the second additional frame member. Furthermore, the aircraft includes a stowage bin bucket disposed between the first supporting panel and the second supporting panel and pivotally attached to the first supporting panel and the second supporting panel. The first supporting panel and the second supporting panel are configured to support loads generated during operation of the stowage bin bucket and to transfer the loads to the first vertical frame member, the first additional frame member, the second vertical frame member, and the second additional frame member.

The aircraft may also include a passenger service unit disposed under the stowage bin and connected to at least one of the first vertical frame member and to the second vertical frame member. In some embodiments, the passenger service unit may be attached to at least one of the first supporting panel and to the second supporting panel. The aircraft may also include a ceiling panel disposed above the stowage bin and connected to at least one of the first additional frame member and the second additional frame. In some embodiments, the ceiling panel may be attached to at least one of the first supporting panel and to the second supporting panel.

Provided also is a method of installing a stowage bin system in an aircraft. The method includes attaching a first supporting panel to a first vertical frame member of the aircraft and to a first additional frame member. The method also involves attaching a second supporting panel to a second vertical frame member of the aircraft and to a second additional frame member. The method then proceeds with inserting a stowage bin bucket between the first supporting panel and the second supporting panel and engaging a pivot mechanism of the first supporting panel with a first pivot mechanism of the stowage bin bucket. The pivot mechanism of the second supporting panel is also engaged with a second pivot mechanism of the stowage bin bucket during this operation. The method may also involve connecting a rate control mechanism of at least one of the first supporting panel and the second supporting panel to the stowage bin bucket. In some embodiments, attaching the first supporting panel to the first additional frame member involves sliding an open channel formed by a gusset of the first supporting panel over the first additional frame member and connecting the open channel to the first additional frame using one or more fasteners.

The features, functions, and advantages that have been discussed can be achieved independently in various embodiments or may be combined in yet other embodiments further details of which can be seen with reference to the following description and drawings.

DETAILED DESCRIPTION

Figure 1:
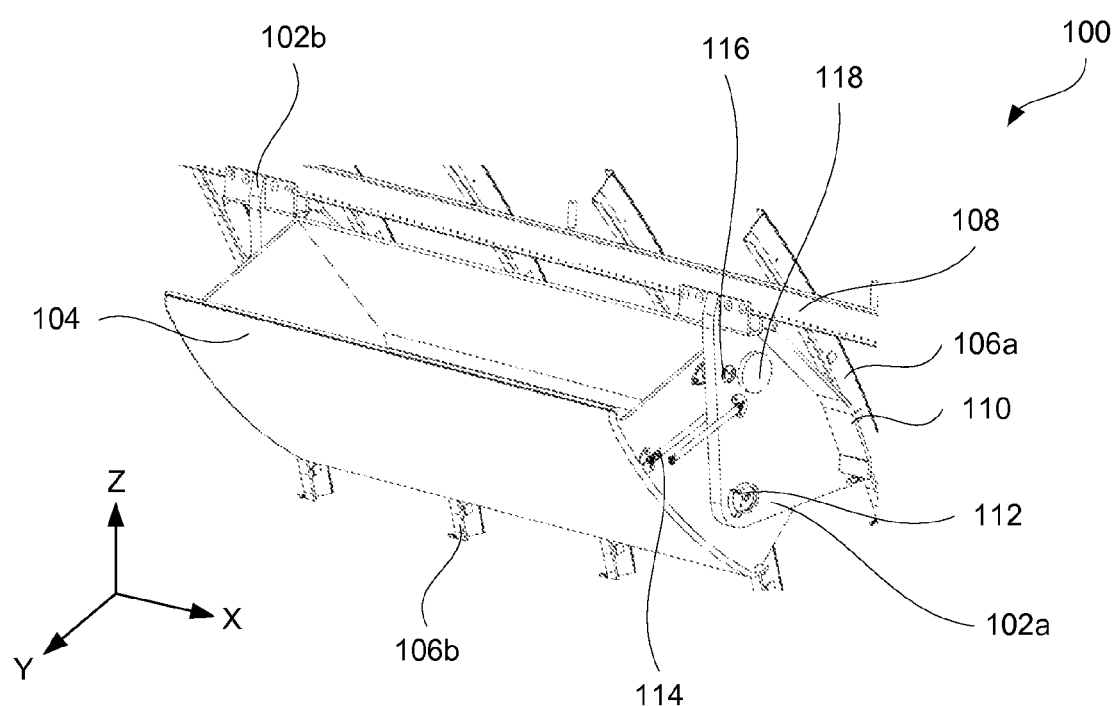
FIG. 1 is a schematic perspective view of a stowage bin system attached to two vertical frame members and a horizontal frame member of an aircraft, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Stowage bin systems presented herein have a lightweight frameless design for supporting stowage bin buckets. Specifically, a stowage bin system includes two supporting panels, which may be disjoined and separate components prior to installation of the stowage bin system onto an aircraft or some other vehicle. During installation, the supporting panels are attached to one or more frame members of the fuselage or some intermediate structures. For brevity, any structure to which a stowage bin system is attached to is referred to as a frame member. The frame member may be present based on the design of the vehicle or installed therein specifically for providing support to the stowage bin system. The stowage bin bucket is installed between and supported by the two supporting panels after installation. The two supporting panels may not be directly connected to each other by any other components of the stowage bin system.

This disjoined (or frameless) design of the supporting panels provides substantial weight saving in comparison to framed design due to absence of the back panel and ability to use one supporting panel for supporting two adjacent stowage bin buckets. Furthermore, this disjoined design allows using the same panels with different lengths of stowage bin buckets. In this new design, the load is more directly transferred between the stowage bin bucket and the frame members providing support to the entire system. The supporting panels are generally the only structures responsible for the load transfer. The supporting panels may include various other components, such as gussets, frame fitting, tension rods, and the like to help with the load transfer. Specifically, the panels provide support in the lateral, vertical, and transverse directions as further describe below. Finally, frameless stowage bin systems are generally easier and faster to install than conventional framed bins. A comparison study has shown that a frameless stowage bin system can be installed three times faster than a conventional framed design. Furthermore, a frameless stowage bin system is expected to weight about 10%-30% less than a conventional framed system.

Supporting panels, which may be also referred to as end panels or end blades, may be flat panels, each panel having two main sides. These sides may be also referred to as main surfaces. One of these main surfaces faces a stowage bin bucket when the system is installed. In some embodiments, each of the two surfaces faces a different stowage bin bucket when the supporting panel is installed in between two stowage bin buckets and is used to support both stowage bin buckets. In some embodiments, a supporting panel may have a triangular shape, such that two corners of this panel are attached to frame members. The third corner may include a pivoting mechanism that engages a corresponding pivoting mechanism on a stowage bin bucket. Supporting panels may include gussets to provide additional lateral support. For example, a gusset may extend perpendicularly to the main surfaces of the supporting panel. In some embodiments, the gusset may have a channel for receiving a frame member. The frame member may tightly fit into the channel of the gusset and be attached by one or more fasteners. The gusset may form a monolithic structure with the supporting panel or be a separate component.

Lateral loads may be transferred between a stowage bin bucket and a supporting panel through a pivoting mechanism and, in some embodiments, through one or more load transferring pads disposed between the stowage bin bucket and a supporting panel. Vertical and transverse loads may be transferred between the stowage bin bucket and the supporting panel through the combined pivoting mechanism and also through a combined interlocking mechanism and, in some embodiments, through an opening rate controlling mechanism, e.g., when the stowage bin bucket is open.

The new design of the stowage bin system also allows ceiling panels and passenger service units (PSUs) to be independent and separate components from the stowage bin system. The ceiling panels and/or the PSUs may be directly connected to frame members and independently from an adjacent stowage bin system. This independent design simplifies and expedites installation and maintenance. The conventional stowage bin uses integrated approach, in which the frame of a stowage bin system supports and partially encloses a stowage bin bucket and provide support for ceiling panels, lighting, and PSUs. As such, these panels, lighting, and PSUs are determined by stowage bin bucket sizes and have to be installed together.

The frameless design of a stowage bin system allows each component of the stowage bin system and adjacent systems and components to be sized independently, to a certain extent, be based on internal requirements of these other systems and components rather than being driven by the size considerations of the stowage bin buckets. As noted above the overall weight, installation time and even fabrication time of a frameless stowage bin system is significantly reduced as a result of this independent approach. For example, preliminary tests indicated that installation time has been reduced by almost three times.

Stowage Bin System Examples

FIG. 1 is a schematic perspective view of a stowage bin system 100 attached to and supported by vertical frame members 106a and 106b and a horizontal frame member 108 of an aircraft or some other vehicle, in accordance with some embodiments. Stowage bin system 100 includes two supporting panels 102a and 102b, which may be referred to as a first supporting panel and a second supporting panel, and stowage bin bucket 104. Vertical frame members 106a and 106b and horizontal frame member 108 are not components of stowage bin system 100. In some embodiments further described below with reference to FIG. 5, stowage bin system 100 may include one or more additional stowage bin buckets and one or more additional supporting panels. Prior to installation of stowage bin system 100, components of stowage bin system 100 may be separate and disjoined from each other. For example, stowage bin system 100 shown in FIG. 1 may be provided as a disassembled kit of two supporting panels 102a and 102b and stowage bin bucket 104. The assembly may be performed during installation of stowage bin system 100 as further explained below with reference to FIG. 7.

Each of supporting panels 102a and 102b is configured to be attached to one or more frame members. For example, a supporting panel may be configured to attach to one vertical frame member in one or more locations, e.g., one or more corners of the supporting panel. Furthermore, the same supporting panel may be configured to attach to another frame member, such as another vertical frame member or a horizontal frame member. This other frame member may be generally referred to as an additional frame member. As such, in some embodiments, the first supporting panel may be configured for attaching to a first vertical frame member and to a first additional frame member of the aircraft, while the second supporting panel may be configured for attaching to a second vertical frame member and to a second additional frame member of the aircraft. In an example illustrated in FIG. 1, the first vertical frame member is vertical frame member 106a. The second vertical frame member is vertical frame member 106b. A portion of the attachment between vertical frame member 106b and supporting panel 102b is hidden behind stowage bin bucket 104. Continuing with this example, the first additional frame member and the second additional frame member are parts of horizontal frame member 108.

After installation of stowage bin system 100, stowage bin bucket 104 is disposed between supporting panels 102a and 102b. More specifically, stowage bin bucket 104 may be pivotally attached to supporting panels 102a and 102b using, for example, pivoting mechanism 112. A portion of pivoting mechanism 112 is provided on each of supporting panels 102a and 102b and the remaining portion is provided on stowage bin bucket 104. These portions of the pivoting mechanism are engage during installation of stowage bin system 100. Pivoting mechanism 112 may be responsible for transferring some load between stowage bin bucket 104 and the corresponding supporting panel.

Supporting panels 102a and 102b may be configured to support loads generated during operation of stowage bin bucket 104 and to transfer these loads to various frame members, such as the first vertical frame member, the first additional frame member, the second vertical frame member, and the second additional frame member. Specifically, the loads (e.g., lateral loads, vertical loads, transverse loads) are transferred from stowage bin bucket 104 to supporting panels 102a and 102b and then from supporting panels 102a and 102b to the frame members. These loads may be generated by and characterized as system loads, content loads, static loads, emergency landing loads, and vibrations, just to name a few.

For purposes of this document, a lateral load is defined as a load in a direction parallel to a central axis of the vehicle (e.g., the center axis of the fuselage). This direction is shown as the X direction in FIG. 1 and other figures. A vertical load is defined as a load in a vertical direction, most commonly the direction of the gravitation force. This direction is shown as the Z direction in FIG. 1 and other figures. A transverse load is defined as a load in a direction perpendicular to the lateral direction and to the vertical direction. This direction is shown as the Y direction in FIG. 1 and other figures.

The lateral loads may be transferred between stowage bin bucket 104 and supporting panels 102a and 102b through pivoting mechanisms 112 and, in some embodiments, through one or more load transferring pads 118 disposed between stowage bin bucket 104 and each of supporting panels 102a and 102b. The vertical and transverse loads may be transferred between stowage bin bucket 104 and supporting panels 102a and 102b through pivoting mechanisms 112 and, in some embodiments, also through interlocking mechanisms 116. Portions of the vertical and transverse loads may be also transferred through rate controlling mechanisms 114, for example, when stowage bin bucket 104 is open.

Interlocking mechanism 116 may be used for retaining stowage bin bucket 104 in a closed position. Interlocking mechanism 116 may engage an interlocking feature attached to a side of stowage bin bucket 104 that faces supporting panel 102a. In some embodiments, interlocking mechanism 116 is also configured to transfer load between stowage bin bucket 104 and supporting panel 102a.

In some embodiments, supporting panel 102a includes rate controlling mechanism 114 for controlling a rate of closing and opening of stowage bin bucket 104. Rate controlling mechanism 114 may be connected to stowage bin bucket 104. Rate controlling mechanism 114 may be in the form of a liquid-filled cylinder or a gas-filled cylinder.

In some embodiments, supporting panel 102a includes load transferring pad 118. Load transferring pad 118 may be disposed between and in contact with the main surface of supporting panel 102a and the side surface of stowage bin bucket 104 that faces the main surface of supporting panel 102a when stowage bin bucket 104 is in a closed position. Load transferring pad 118 may be configured to withstand compressive loads and to transfer these loads in the direction substantially normal to the main surface of supporting panel 102a.

Figure 2A:
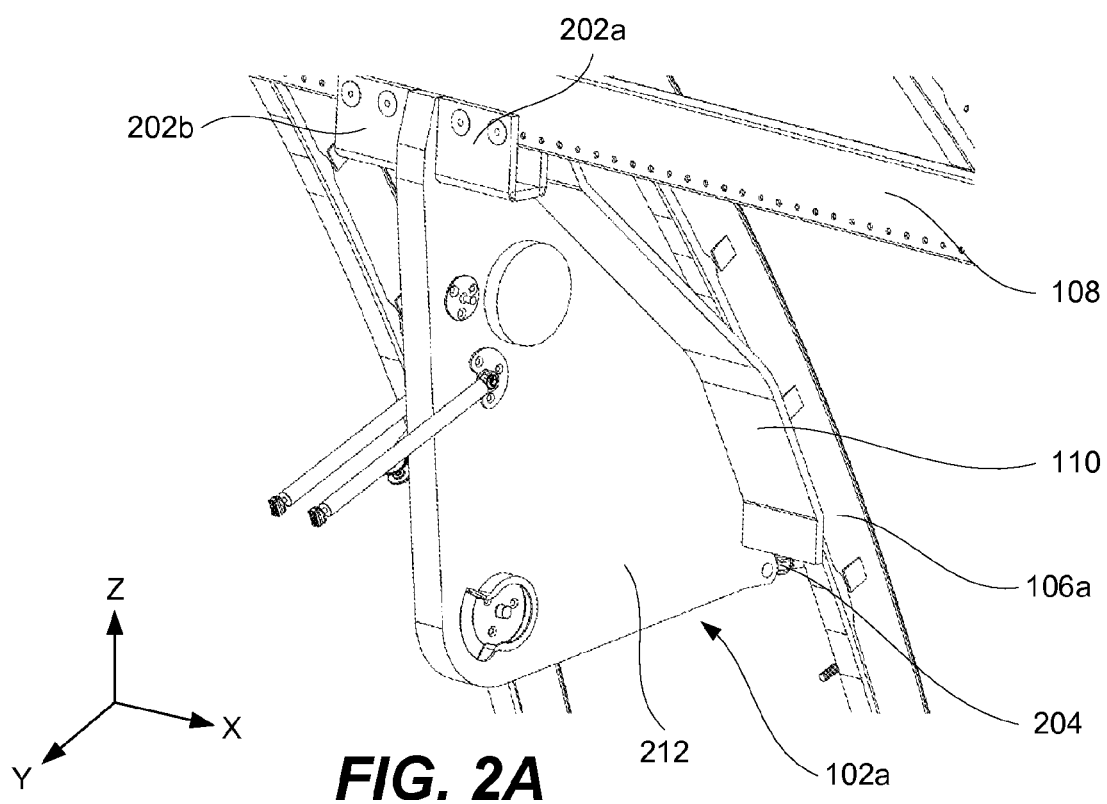
FIG. 2A is a schematic perspective view of a supporting panel attached to a vertical frame member and a horizontal frame member of an aircraft, in accordance with some embodiments.
Figure 2B:
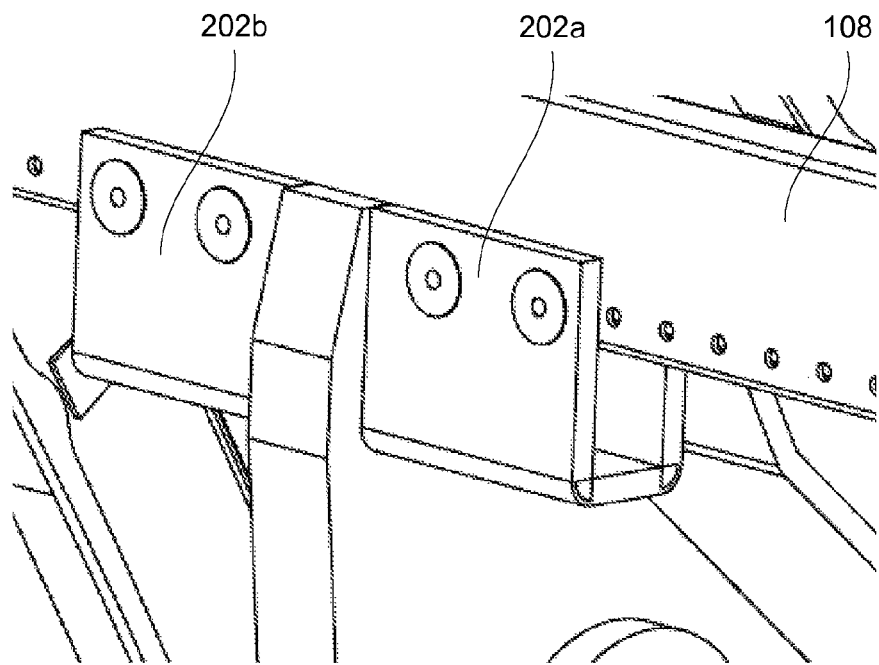
FIG. 2B is an expanded perspective view of a gusset of the supporting panel in FIG. 2A, in accordance with some embodiments.

To support and transfer loads to frame members, each of supporting panels 102a and 102b may be attached to frame members in one, two, or more locations, which will now be described with reference to FIGS. 2A-2C. Specifically, FIG. 2A illustrates supporting panel 102a attached to vertical frame member 106a and horizontal frame member 108 without any buckets being attached supporting panel 102a. FIG. 2A may represent an intermediate stage during installation of the storage bin system, e.g., a stage prior to operation 706 as further described below with reference to FIG. 7. Supporting panel 102a includes gusset 110, which may extend away from two main surfaces of supporting panel 102a. One of these main surfaces is shown as element 212 in FIG. 2A. The two main surfaces are parallel to the Y-Z plane. Gusset 110 may extend substantially perpendicular (e.g., between 85° and 95°) to the two main surfaces of supporting panel 102a (e.g., extend along the X direction). Gusset 110 may extend away from one surface only (not shown) or both surfaces (as shown in FIG. 2A).

Gusset 110 may include one or more open channels for sliding over one or more frame members. The channels may help to bear the vertical forces and the lateral forces as well as the torque around the Z axis. As shown in FIGS. 2A and 2B, gusset 110 may include two channels 202a and 202b. Channels 202a and 202b may include openings for protruding fasteners. Channels 202a and 202b may be configured to snugly fit over a corresponding frame member. In some embodiments, channels 202a and 202b may have a rectangular profile as, for example, shown in FIG. 2B.

Figure 2C:
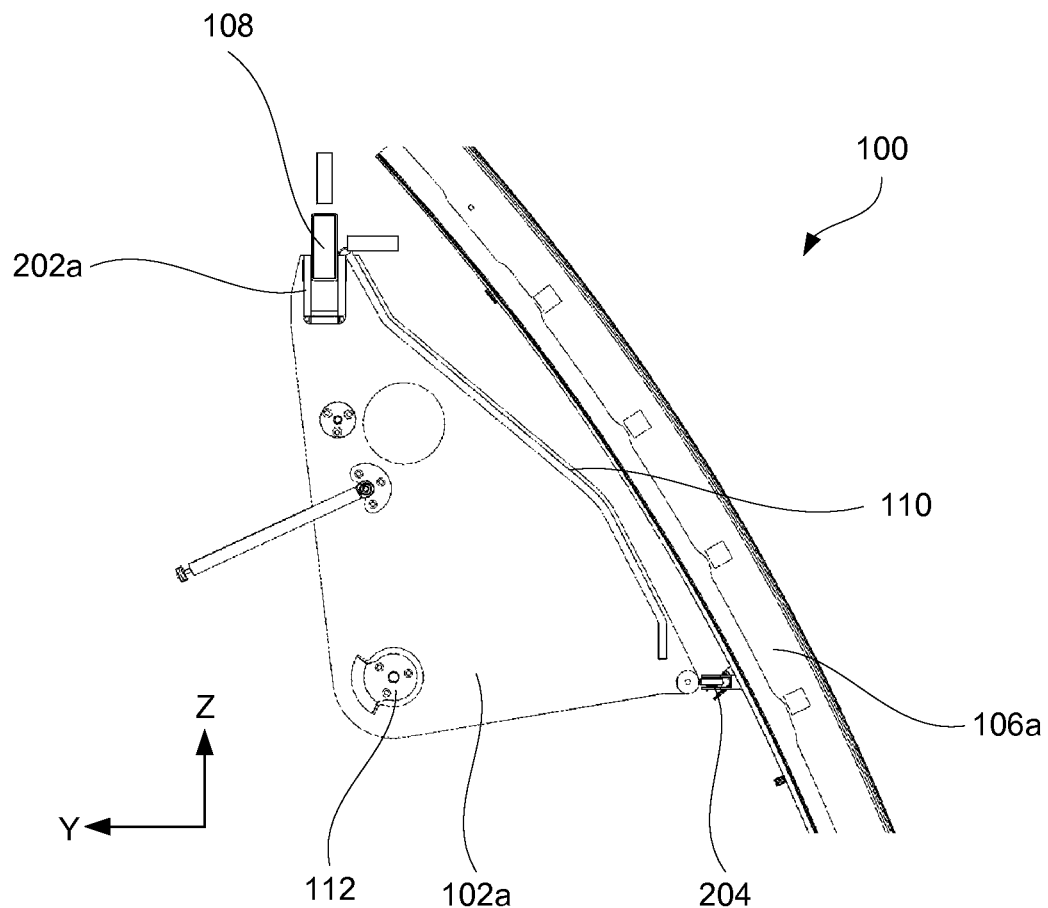
FIG. 2C is a schematic side view of the supporting panel in FIG. 2A, in accordance with some embodiments

FIG. 2C is a side schematic view of supporting panel 102a connected to vertical frame member 106a using fastener 204. Some examples of such fasteners include bolts-nuts, pins (e.g., quick release pins), rivets, and the like. As shown in FIG. 2C, supporting panel has a triangular shape having a bottom outer corner (i.e., a first corner), a top inner corner (i.e., a second corner), and a bottom inner corner (i.e., a third corner). The first corner may be attached to vertical frame member 106a, the second corner may be attached to horizontal frame member 108, while the third corner may include pivoting mechanism 112 for pivotally attaching a stowage bin.

Figure 3:
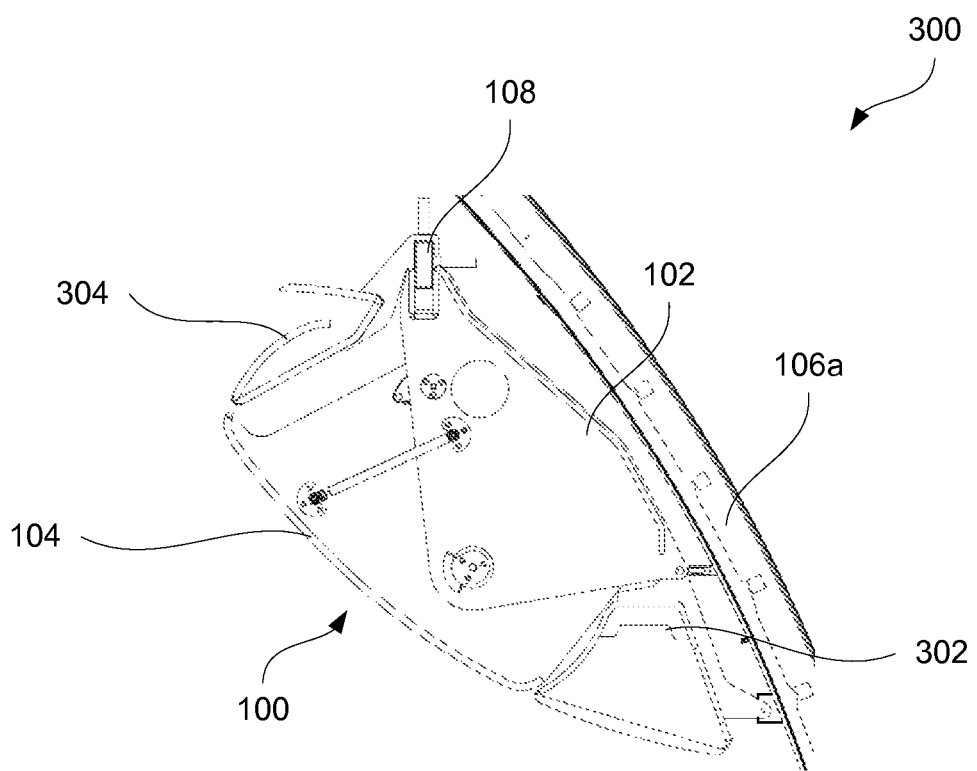
FIG. 3 is a schematic side view of the stowage bin system together with a ceiling panel and a passenger service unit installed on the aircraft, in accordance with some embodiments.

FIG. 3 is a side schematic view of an assembly 300 including stowage bin system 100, passenger service unit 302, and ceiling panel 304, in accordance with some embodiments. Passenger service unit 302 may be disposed under stowage bin system 100 and may house a light, a fan, drop down video monitors, oxygen drops, and/or a call button. Ceiling panel 304 may be disposed above stowage bin system 100 and may be used to cover the gap between the ceiling and stowage bin system 100. In some embodiments, ceiling panel 304 may cover the opening of stowage bin bucket 104 when this bucket is in the closed position as, for example, shown in FIG. 3.

Stowage bin system 100 may be installed without first attaching passenger service unit 302 and/or ceiling panel 304 to stowage bin system 100. Each one of stowage bin system 100, passenger service unit 302, and ceiling panel 304 may be installed independently. Furthermore, each one of stowage bin system 100, passenger service unit 302, and ceiling panel 304 may be attached independently to frame members. As described above with reference to FIG. 2C, stowage bin system 100 may be attached to one or more frame members, such as horizontal frame member 108 and vertical frame member 106a. As shown in FIG. 3, passenger service unit 302 may be attached to vertical frame member 106a. In some embodiments, passenger service unit 302 is not attached to stowage bin system 100. Ceiling panel 304 may be attached to horizontal frame member 108 as shown in FIG. 3. In some embodiments, ceiling panel 304 is not attached to stowage bin system 100. Passenger service unit 302 and/or ceiling panel 304 may be attached to other frame members that are not shown in FIG. 3.

Figure 4A:
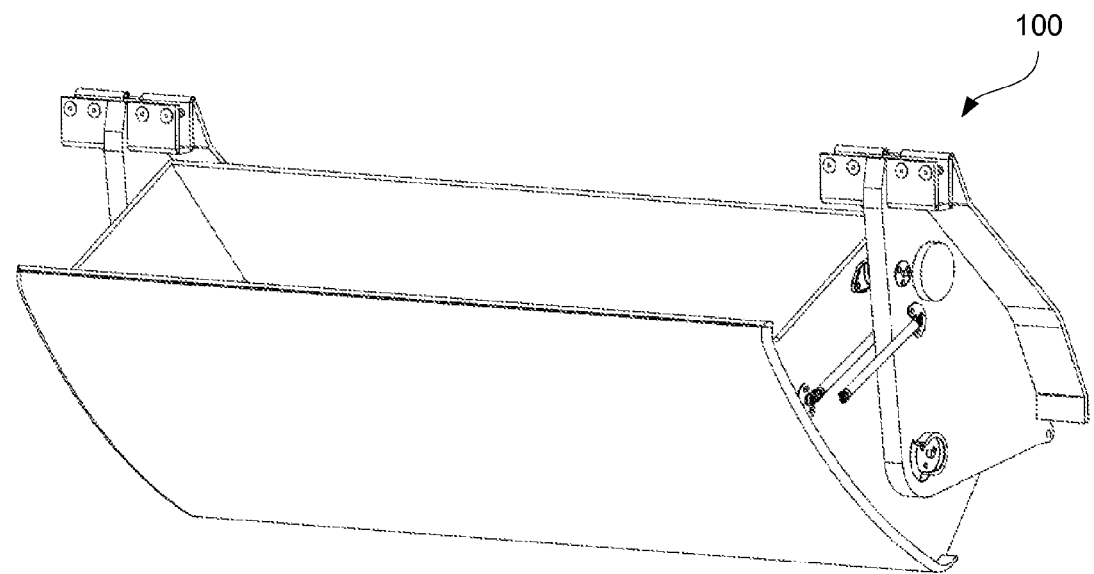
FIG. 4A is a schematic perspective view of a standalone stowage bin system, in accordance with some embodiments.

FIG. 4A illustrates a standalone stowage bin system 100 without showing any frame members. In general, stowage bin system 100 may be supplied as a set of disassembled components, such as a stowage bin bucket and one or two supporting panels. As further described below with reference to FIG. 7, the supporting panels may be first attached to frame members and then the stowage bin bucket is attached to these installed supporting panels.

Figure 4B:
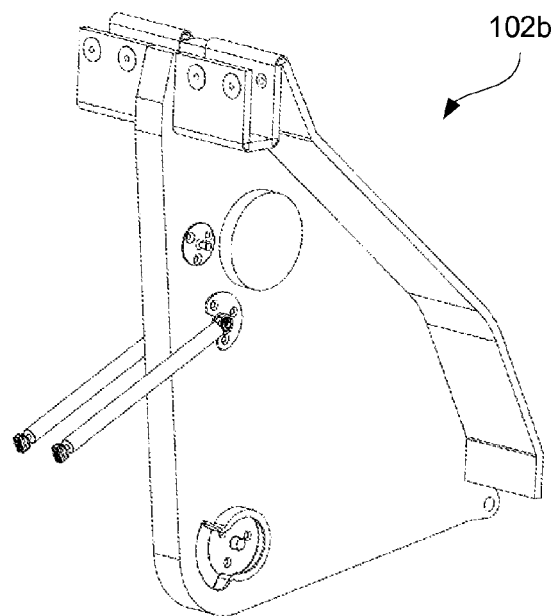
FIG. 4B is a schematic perspective view of a supporting panel of the stowage bin system, in accordance with some embodiments.

FIG. 4B illustrates a standalone supporting panel 102a, which may be supplied as it is show in the figure. Alternatively, supporting panel 102a may be supplied as a set of components, which are assembled during installation of supporting panel 102a. For example, one or more of rate controlling mechanism 114, pivoting mechanism 112, interlocking mechanism 116, or load transferring pad 118 may be attached to supporting panel 102a before or after supporting panel 102a is attached to one or more frame members.

Figure 5:
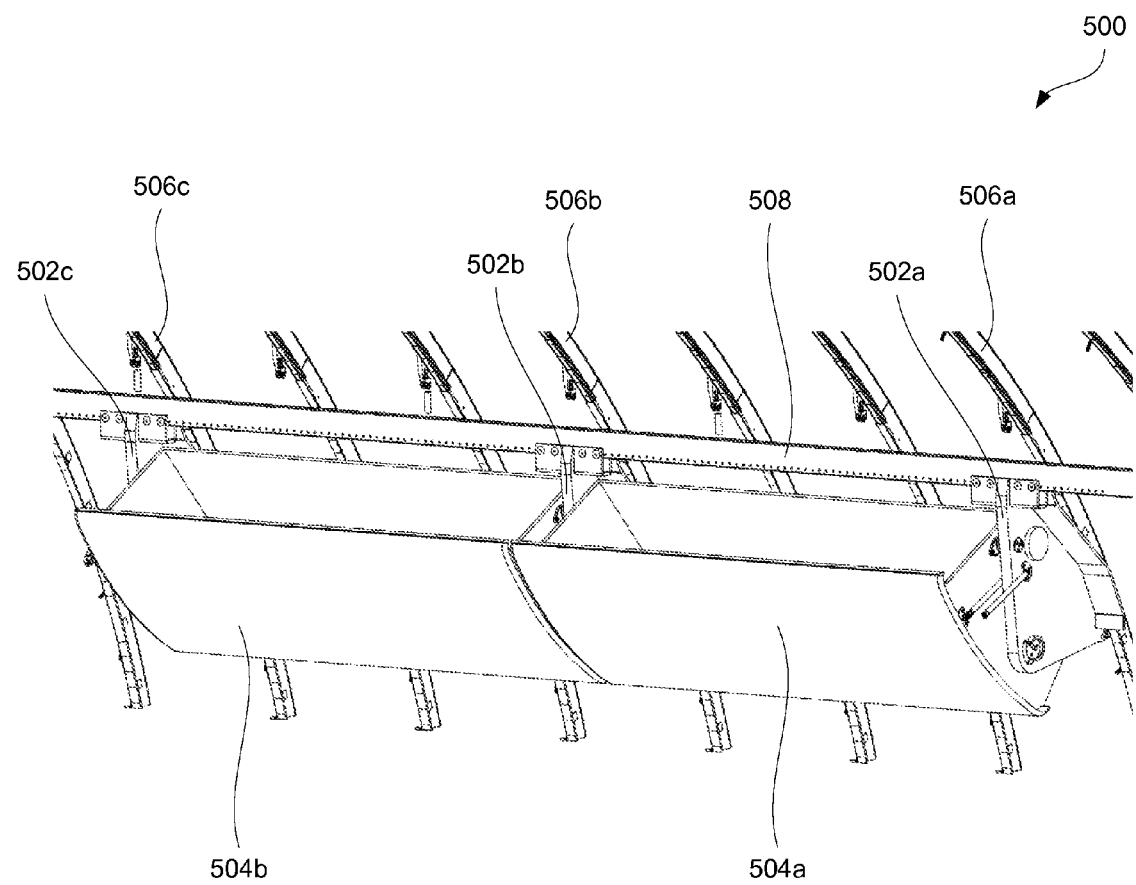
FIG. 5 is a schematic perspective view of a stowage bin system including two stowage bin buckets, in accordance with some embodiments.

FIG. 5 illustrates a stowage bin system 500 including two stowage bin buckets 504a and 504b supported by three supporting panels 502a-502c, in accordance with some embodiments. Specifically, stowage bin bucket 504a is supported by supporting panels 502a and 502b, while stowage bin bucket 504b is supported by supporting panels 502b and 502c. It should be pointed out that supporting panel 502b provides support to both stowage bin buckets 504a and 504b. This supporting panel 502b may be referred to as a middle supporting panel, while supporting panels 502a and 502c may be referred to as end supporting panels. If another stowage bin bucket is added to stowage bin system 500 and installed to the right of stowage bin bucket 504a, then supporting panel 502a may become a middle supporting panel. In some embodiments, middle supporting panels and end supporting panels may have the same design. Supporting panels 502a-502c are shown attached to their respective vertical frame members 506a-506c and to a common horizontal frame member 508.

In some embodiments, supporting panel 502b has a first main surface facing stowage bin bucket 504a and a second main surface facing stowage bin bucket 504b. Furthermore, supporting panel 502b includes a first load transferring pad and a second load transferring pad (not visible in FIG. 5). The first load transferring pad is disposed between and in contact with the first main surface and a side surface of stowage bin bucket 504a when stowage bin bucket 504a is in its closed position. The second load transferring pad is disposed between and in contact with the second main surface and a side surface of stowage bin bucket 504b when stowage bin bucket 504b is in its closed position. In some embodiments, locations of the first load transferring pad on the first surface and of the second load transferring pad on the second surface substantially coincide.

Figure 6:
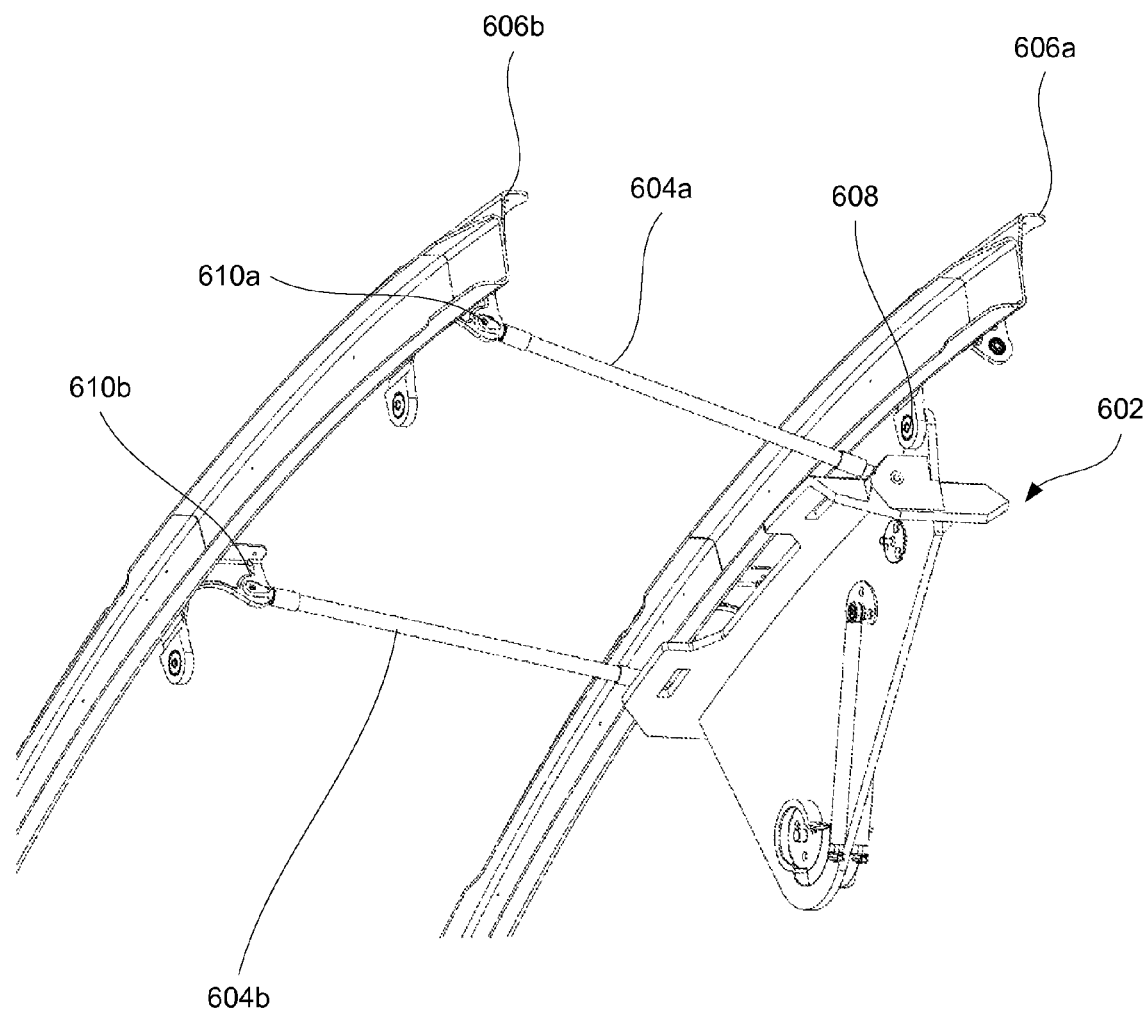
FIG. 6 is a schematic perspective view of a supporting panel attached to two vertical frame members, in accordance with some embodiments.

FIG. 6 illustrates a supporting panel 602 attached to and supported by two vertical frame members 606a and 606b, in accordance with some embodiments. Specifically, supporting panel 602 may have two attachment points to vertical frame member 606a, for example, at the top inner corner 608 of supporting panel 602 and at the bottom inner corner (hidden in FIG. 6). A frame fitting may be used in each of these corners to provide this attachment and support. The frame fitting may be a part of supporting panel 602. Attachment of supporting panel 602 to vertical frame member 606b is provided by two tension rods 604a and 604b. In some embodiments, tension rods 604a and 604b may be attached to frame fittings 610a and 610b that may be used for attaching to another supporting panel (not shown).

Installation Examples

Figure 7:
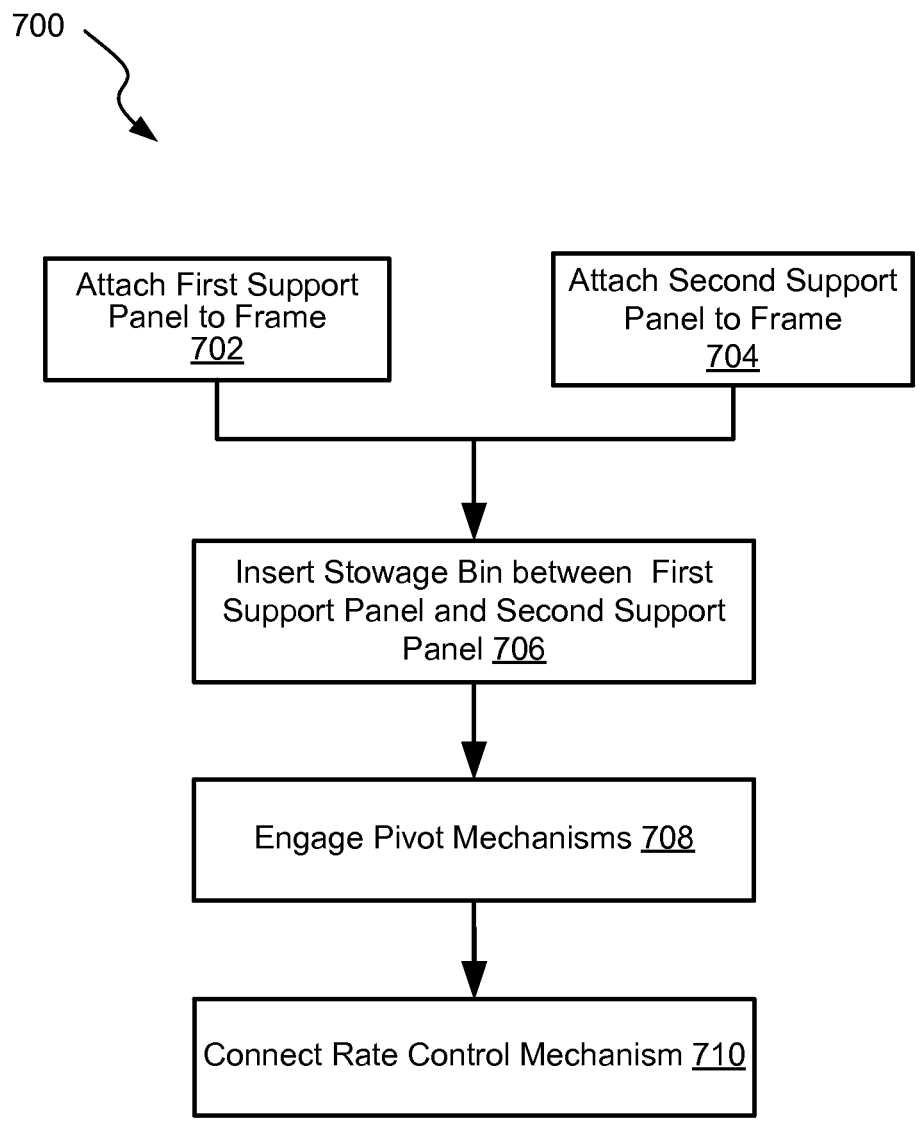
FIG. 7 is a process flowchart corresponding to a method of installing a stowage bin system in an aircraft, in accordance with some embodiments.

FIG. 7 is a process flowchart corresponding to a method 700 of installing a stowage bin system in an aircraft or some other vehicle, in accordance with some embodiments. Method 700 may commence with attaching a first supporting panel to a first vertical frame member of the aircraft and to a first additional frame member during operation 702. Method 700 also involves attaching a second supporting panel to a second vertical frame member of the aircraft and to a second additional frame member during operation 704. Various mechanical fasteners may be used for these purposes, such as rivets, screws, and the like.

In some embodiments, operation 702 may involve sliding a channel formed by a gusset of the first supporting panel over the first additional frame member (e.g., a portion of the horizontal frame member) and connecting the channel to the first additional frame using one or more fasteners. In some embodiments, an attachment technique that does not require fasteners may be used. Likewise, operation 704 may involve sliding a channel formed by a gusset of the second supporting panel over the second additional frame member (e.g., another portion of the horizontal frame member) and connecting the channel to the second additional frame using one or more fasteners.

Alternatively, operation 702 may involve connecting a supporting panel to two vertical frame members as, for example, shown in FIG. 6. The frame members may have frame fitting installed thereon. Two of these frame fittings disposed on the same vertical frame member may be directly connected to the supporting panel. The supporting panel may be also attached to another vertical frame member using, for example, two tension rods. These rods may be connected directed to this other frame member or to frame fitting installed on this other frame member.

Operations 702 and 704 may be performed in sequence or in parallel as, for example, shown in FIG. 7. In some embodiments, all supporting panels of a storage bin system may be installed prior to installation of any stowage bin buckets as described below. In some embodiments, operations 702 and 704 may also involve attaching various mechanism and components to supporting panels and/or frame members. For example, additional frame members (e.g., horizontal frame members) may be attached to previously provided frame members (e.g., vertical frame members). One or more rate control mechanisms, one or more pivoting mechanisms, one or more interlocking mechanisms, and/or one or more load transferring pads may be attached to one or both of supporting panels during operations 702 and 704.

Method 700 may proceed with inserting a stowage bin bucket between the first supporting panel and the second supporting panel during operation 706. In some embodiments, operation 706 may also involve attaching various mechanism and components to the stowage bin bucket. For example, one or more rate control mechanisms, one or more pivoting mechanisms, one or more interlocking mechanisms, and/or one or more load transferring pads may be attached to stowage bin bucket during operation 706.

Method 700 may proceed with engaging a pivot mechanism of the first supporting panel with a first pivot mechanism of the stowage bin bucket and a pivot mechanism of the second supporting panel with a second pivot mechanism of the stowage bin bucket during operation 708. Method 700 may also involve connecting a rate control mechanism of at least one of the first supporting panel and the second supporting panel to the stowage bin during operation 710.

Aircraft Examples

Provided also is an aircraft including a first vertical frame member, a second vertical frame member extending substantially parallel to the first vertical frame member, a first additional frame member, and a second additional frame member. Various examples of frame members are presented in FIG. 1 and described above with reference to this figure. The aircraft also includes a first supporting panel attached to the first vertical frame member and to the first additional frame member, a second supporting panel attached to the second vertical frame member and to the second additional frame member, and a stowage bin bucket disposed between the first supporting panel and the second supporting panel and pivotally attached to the first supporting panel and the second supporting panel. The first supporting panel and the second supporting panel may be configured to support loads generated during operation of the stowage bin and to transfer the loads to the first vertical frame member, the first additional frame member, the second vertical frame member, and the second additional frame member.

In some embodiments, the first additional frame member and the second additional frame member are parts of a horizontal frame member extending substantially normal to the first vertical frame member and to the second vertical frame member. The aircraft may also include a passenger service unit disposed under the stowage bin and connected to at least one of the first vertical frame member and to the second vertical frame member. In some embodiments, the passenger service unit may be attached to at least one of the first supporting panel and the second supporting panel. The aircraft may also include a ceiling panel disposed above the stowage bin and connected to at least one of the first additional frame member and the second additional frame. In some embodiments, the ceiling panel may be attached to at least one of the first supporting panel and to the second supporting panel.

Figure 8:
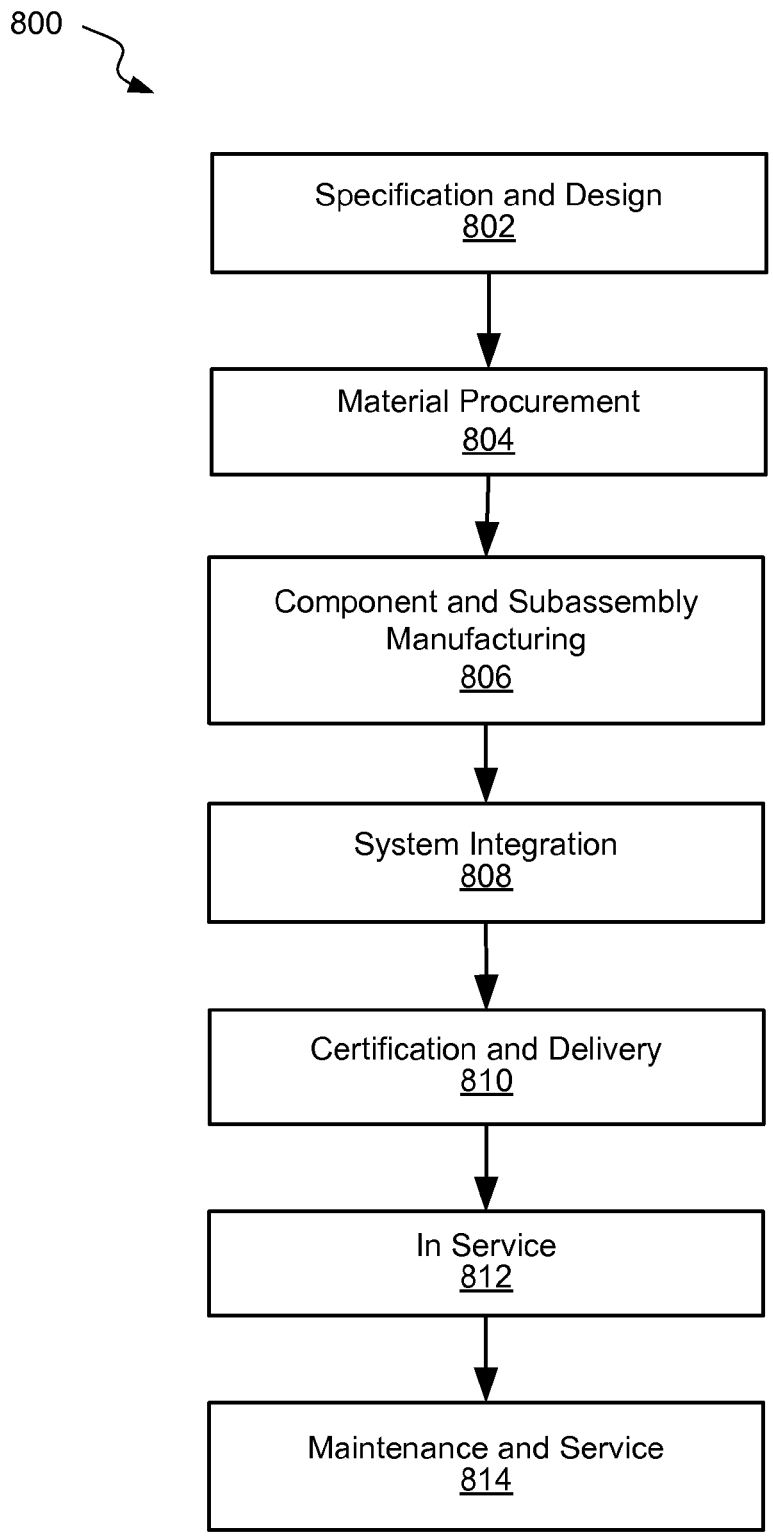
FIG. 8 is a flow diagram of aircraft production and service methodology.

An aircraft manufacturing and service method 800 shown in FIG. 8 and an aircraft 900 shown in FIG. 9 will now be described to better illustrate various features of processes and systems presented herein. During pre-production, aircraft manufacturing and service method 800 may include specification and design 802 of the aircraft and material procurement 804. The production phase involves component and subassembly manufacturing 806 and system integration 808 of the aircraft. In some embodiments, a storage bin system is installed on the aircraft during either manufacturing 806 or system integration 808.

Thereafter, the aircraft may go through certification and delivery 810 in order to be placed in service 812. While in service by a customer, the aircraft is scheduled for routine maintenance and service 814 (which may also include modification, reconfiguration, refurbishment, and so on). A storage bin system may be also installed on the aircraft and/or removed from the aircraft during its service 814. While the examples described herein relate generally to servicing of commercial aircraft, they may be practiced at other stages of the aircraft manufacturing and service method 800.

Each of the processes of aircraft manufacturing and service method 800 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

Figure 9:
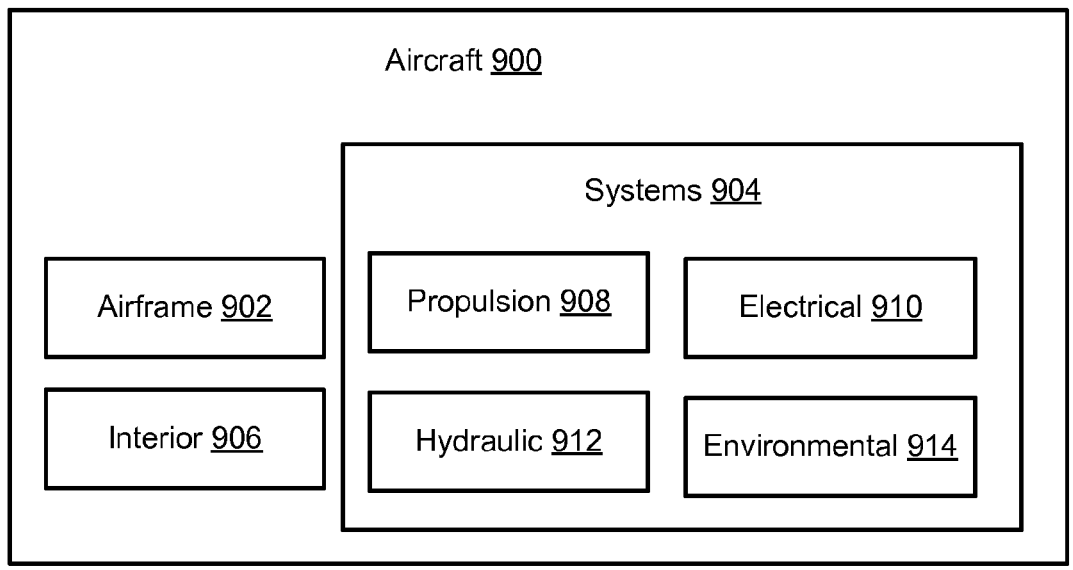
FIG. 9 is a block diagram of an aircraft.

As shown in FIG. 9, aircraft 900 produced by aircraft manufacturing and service method 800 may include airframe 902, interior 906, and multiple systems 904 and interior 906. A storage bin system may be a part of interior 906. Examples of systems 904 include one or more of propulsion system 908, electrical system 910, hydraulic system 912, and environmental system 914. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 800. For example, without limitation, components or subassemblies corresponding to component and subassembly manufacturing 806 may be fabricated or manufactured in a manner similar to components or subassemblies produced while the aircraft is in service.

Also, various features described herein may be utilized during aircraft component and subassembly manufacturing 806 and/or during system integration 808, which may expedite assembly of or reducing the cost of the aircraft. In some examples, these features may be utilized while the aircraft is in service, for example, during maintenance and service 814 of the aircraft.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A stowage bin system for use on an aircraft, the stowage bin system comprising:
   a first supporting panel configured to attach to a first vertical frame member and attach to a first additional frame member of the aircraft;
   wherein the first supporting panel comprises a gusset extending substantially normal to the first supporting panel to form a channel for attaching to the additional frame member;
   a second supporting panel configured to attach to a second vertical frame member and attach to a second additional frame member of the aircraft; and
   a first stowage bin bucket disposed between the first supporting panel and the second supporting panel,
   the first stowage bin bucket pivotally attached to the first supporting panel and the second supporting panel,
   the first supporting panel and the second supporting panel are configured to support loads generated during operation of the first stowage bin bucket and to transfer the loads to the first vertical frame member, the first additional frame member, the second vertical frame member, and the second additional frame member.

2. The stowage bin system of claim 1, wherein the first supporting panel and the second supporting panel are planar structures parallel to each other.

3. The stowage bin system of claim 1, wherein the first supporting panel and the second supporting panel are disjoint structures.

4. The stowage bin system of claim 1, wherein the gusset extends away from both main surfaces of the first supporting panel and forms a channel around the first additional frame member.

5. The stowage bin system of claim 1, wherein the gusset forms a monolithic structure with one or both main surfaces of the first supporting panel.

6. The stowage bin system of claim 1, wherein the first additional frame member and the second additional frame member are parts of a horizontal frame member.

7. The stowage bin system of claim 1, wherein the first supporting panel has a triangular shape having a first corner, a second corner, and a third corner,
   wherein the first corner is attached to the first vertical frame member,
   wherein the second corner is attached to the first additional frame member, and
   wherein the third corner comprises a pivoting mechanism for pivotally attaching the first stowage bin bucket.

8. The stowage bin system of claim 1, wherein the first supporting panel comprises an interlocking mechanism for interlocking with the first stowage bin bucket and retaining the first stowage bin bucket in a closed position.

9. The stowage bin system of claim 1, wherein the first supporting panel comprises a rate controlling mechanism for controlling a rate of closing and opening of the first stowage bin bucket, the rate controlling mechanism being connected to the first stowage bin bucket.

10. The stowage bin system of claim 1, wherein the first supporting panel comprises a load transferring pad, the load transferring pad being disposed between and in contact with a main surface of the first supporting panel and a side surface of the first stowage bin bucket when the first stowage bin bucket is in a closed position.

11. The stowage bin system of claim 1, further comprising a second stowage bin bucket pivotally attached to the first supporting panel such that the first supporting panel is disposed between the first stowage bin bucket and the second stowage bin bucket and supports at least some loads generated during operation of each of the first stowage bin bucket and the second stowage bin bucket.

12. The stowage bin system of claim 11, wherein the first supporting panel comprises a first main surface facing the first stowage bin bucket and a second main surface facing the second stowage bin bucket,
   the first supporting panel comprising a first load transferring pad and a second load transferring pad,
      the first load transferring pad being disposed between and in contact with the first main surface and a side surface of the first stowage bin bucket when the first stowage bin bucket is in a closed position,
      the second load transferring pad being disposed between and in contact with the second main surface and a side surface of the second stowage bin bucket when the second stowage bin bucket is in a closed position.

13. The stowage bin system of claim 12, wherein locations of the first load transferring pad on the first surface and of the second load transferring pad on the second surface substantially coincide.

14. An aircraft comprising:
   a first vertical frame member;
   a second vertical frame member extending substantially parallel to the first vertical frame member;
   a first additional frame member;
   a second additional frame member;

a first supporting panel attached to the first vertical frame member and to the first additional frame member;

wherein the first supporting panel comprises a gusset extending substantially normal to the first supporting panel to form a channel for attaching to the additional frame member;

a second supporting panel attached to the second vertical frame member and to the second additional frame member; and a stowage bin bucket disposed between the first supporting panel and the second supporting panel and pivotally attached to the first supporting panel and the second supporting panel, the first supporting panel and the second supporting panel are configured to support loads generated during operation of the stowage bin bucket and to transfer the loads to the first vertical frame member, the first additional frame member, the second vertical frame member, and the second additional frame member.

15. The aircraft of claim 14, wherein the first additional frame member and the second additional frame member are parts of a horizontal frame member extending substantially normal to the first vertical frame member and to the second vertical frame member.

16. The aircraft of claim 14, further comprising a comprising a passenger service unit disposed under the stowage bin and connected to at least one of the first vertical frame member and to the second vertical frame member.

17. The aircraft of claim 14, further comprising a ceiling panel disposed above the stowage bin and connected to at least one of the first additional frame member and the second additional frame.

18. A method of installing a stowage bin system in an aircraft, the method comprising:

attaching a first supporting panel to a first vertical frame member and to a first additional frame member, wherein attaching the first supporting panel to the first additional frame member comprises sliding an open channel formed by a gusset of the first supporting panel over the first additional frame member and connecting the open channel to the first additional frame member using one or more fasteners;

the first vertical frame member and the first additional frame member being parts of the aircraft;

attaching a second supporting panel to a second vertical frame member and to a second additional frame member, the second vertical frame member and the second additional frame member being parts of the aircraft;

inserting a stowage bin bucket between the first supporting panel and the second supporting panel;

engaging a pivot mechanism of the first supporting panel with a first pivot mechanism of the stowage bin bucket and a pivot mechanism of the second supporting panel with a second pivot mechanism of the stowage bin bucket; and connecting a rate control mechanism of at least one of the first supporting panel and the second supporting panel to the stowage bin bucket.

* * * * *